United States Patent [19]
Ikenga et al.

[11] 3,870,941
[45] Mar. 11, 1975

[54] METHOD AND CIRCUIT FOR SAMPLING POSITION DATA

[75] Inventors: Junichi Ikenga; Shigeru Matsuoka, both of Toyama; Yoshio Okabe, Kawasaki, all of Japan

[73] Assignee: Kabushiki Kaisha Fujikoshi, Toyama-ken, Japan

[22] Filed: June 25, 1973

[21] Appl. No.: 373,116

[30] Foreign Application Priority Data
June 30, 1972 Japan.............................. 47-65610

[52] U.S. Cl................................... 318/636, 318/326
[51] Int. Cl.............................................. G05b 21/02
[58] Field of Search.......................... 318/636, 326

[56] References Cited
UNITED STATES PATENTS
3,490,691  1/1970  Uyetani et al. ................. 318/636 X
3,708,737  1/1973  Johnson............................. 318/636
3,727,120  4/1973  Jewell et al. ...................... 318/636
3,758,757  9/1973  Buhler .......................... 318/636 X
3,777,128  12/1973  Kirkham ....................... 318/636 X

*Primary Examiner*—B. Dobeck
*Attorney, Agent, or Firm*—Flynn & Frishauf

[57] ABSTRACT

In a method and circuit for sampling position data for use in the continuous path control of an industrial robot, position data representing the position of a drive axis of the industrial robot is generated, and the position data is sampled in accordance with a sampling pulse having a frequency which is a function of the speed of the drive axis. The sampled position data is stored in a memory device included in the continuous path control.

The sampling pulse is generated by a voltage-frequency converter which converts the output of a tachometer generator coupled to the drive axis into a signal having a frequency which is a function of, i.e. the voltage of the output from the tachometer generator.

18 Claims, 4 Drawing Figures

METHOD AND CIRCUIT FOR SAMPLING POSITION DATA

BACKGROUND OF THE INVENTION

This invention relates to a method and circuit for sampling position data at a constant pitch for use in a continuous path control of an industrial robot.

When storing a prescribed locus in a memory device, such as a magnetic disc or magnetic drum, which is contained in a continuous path control unit for an industrial robot by using a teaching control play-back system, the moving points of the industrial robot are sampled from time to time. However, when the position data are sampled at a constant sampling frequency as in the prior art method, the spacing between sampled points may be narrower or wider then the desired spacing where the axis feed speed is increased or decreased. Where the spacing is narrower than the correct spacing it would be necessary to increase the capacity of the memory device to a value more than that required for a given total length of the CP locus, whereas where the spacing is too wide it would be difficult to maintain the accuracy of the reproduced locus in a desired range. As above described, in the prior art automatic sampling system since the sampling frequency was maintained constant irrespective of the feed speed, it has been necessary to increase the capacity of the memory device to a uneconomical extent and the reproduced locus became different from the desired locus. For this reason, the prior art continuous path control for an industrial robot can not provide a desired control for such applications as arc welding, plasma welding and melting welding which require reproduction of the locus at especially high accuracies. Such a problem results from the adoption of the teaching control play-back system which is the simplest system for programming a memory device. Although such a problem would not occur if programming is made by analyzing a coordinate diagram as in the prior art numerical control system, such system can not enjoy the advantages of easy programming which is one of the advantageous features of the industrial robot.

SUMMARY OF THE INVENTION

It is an object of this invention to provide an improved method and circuit for sampling position data at a sampling frequency corresponding to the feed speed of a drive axis of the machine.

In accordance with one aspect of this invention there is provided a method of sampling position data for use in the continuous path control of an industrial robot, which comprises the steps of generating position data representing the position of a drive axis of the industrial robot, generating a sampling pulse signal having a frequency which is a function of the speed of the drive axis, and sampling the position data in accordance with the sampling pulses.

In accordance with another aspect of this invention, there is provided a sampling circuit for use in the continuous path control of an industrial robot, comprising means for generating position data representing the position of a drive axis of the industrial robot, means for generating a sampling pulse signal having a frequency which is a function of to the speed of the drive axis, and means for sampling the position data in accordance with the sampling pulses.

According to one embodiment of this invention the means for generating the sampling pulse signal comprises means for generating a pulse signal representing the feed speed of a drive axis, an integrator for integrating the pulse signal and a plurality of parallel circuits connected to the output of the integrator, each of the parallel circuits including a comparator which compares the output of the integrator with a predetermined reference speed voltage and a sampling pulse generator connected in series with the comparator and having a frequency corresponding to the predetermined reference speed voltage.

According to a modified embodiment of this invention, the means for generating the sampling pulse comprises a tachometer generator coupled to the drive axis and a voltage-frequency converter for converting the output of the tachometer generator into a pulse signal having a frequency which is a function of to the output voltage of the tachometer generator. dr

DESCRIPTION OF THE PREFERRED EMBODIMENTS

Figure 1:
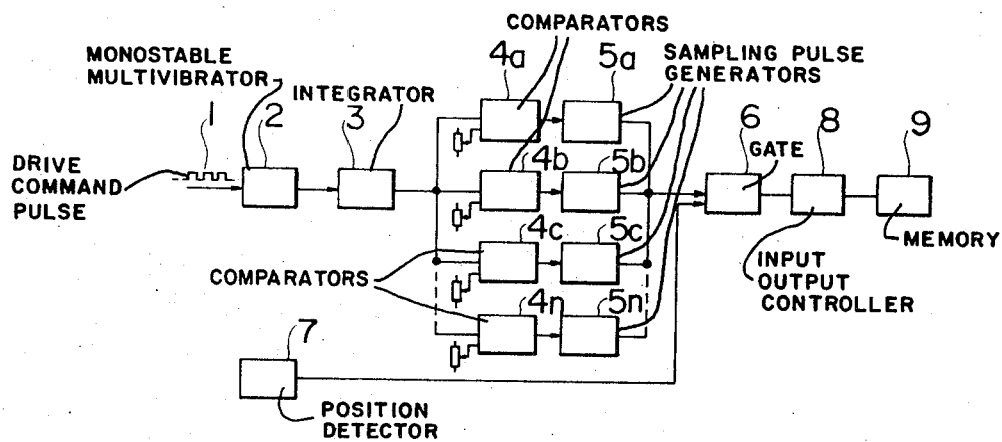
FIG. 1 is a block diagram showing one embodiment of this invention.

In a preferred embodiment of this invention shown in FIG. 1, an axis drive command pulse 1 from a pulse generator, not shown, is applied to a monostable multi-vibrator 2 to shape its waveform. The output of the monostable multi-vibrator 2 is applied to an integrator 3 to convert the density of the pulse into an analogue voltage. This voltage is impressed upon a plurality of speed comparators $4a, 4b \ldots 4n$ to be compared with respective reference speed voltages which are generated by associated potentiometers and differ stepwisely so that only the comparators which receive differential inputs exceeding a predetermined level produce output pulses which are applied to corresponding sampling pulse generators $5a, 5b \ldots 5n$ which are constructed to operate at different frequencies corresponding to said different reference speed voltages. Consequently, the position data of the drive axis are sampled at the frequencies of the sampling pulse generators. Each pair of a speed comparator and the sampling pulse generator is related such that the spacing or interval between position data is made to be equal to the desired spacing at the reference speed of the particular comparator.

The outputs sampled at the frequencies of the sampling pulse generators are applied to one input of a gate circuit 6 and a position data detected by an axis position detector 7 and varying from time to time is applied to the other input of the gate circuit 6. In response to these signals, the gate circuit 6 is enabled to store the data signal generated by the axis position detector 7 in a digital type memory device 9 through an input/output control circuit 8.

Figure 2:
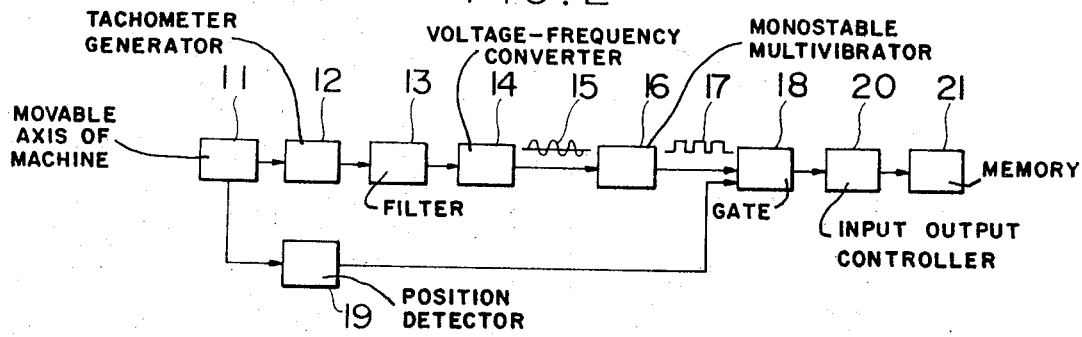
FIGS. 2, 3, and 4 are block diagrams showing modified embodiments of this invention.

In the modified embodiment shown in FIG. 2, the output from a tachometer generator 12 coupled to the movable axis 11 of the machine is applied to a voltage-frequency converter 14 through a filter 13 for producing a signal 15 having a frequency proportional to voltage. The waveform of signal 15 is shaped by a monostable multivibrator 16 to produce a sampling pulse 17 which is applied to one input of a gate circuit 18. A digital position data generated by an axis position detector 19 coupled to the axis 11 is applied to the other input of the gate circuit 18. Thus, each time the sampling pulse 17 is applied the gate circuit 18 is enabled to store the position data in a memory device 21 at an address designated by a control signal provided by an input/output control circuit 20. In this manner, the sampling frequency is varied in accordance with the speed of the axis so that it is possible to store in the memory device the position data having a constant spacing.

Figure 3:
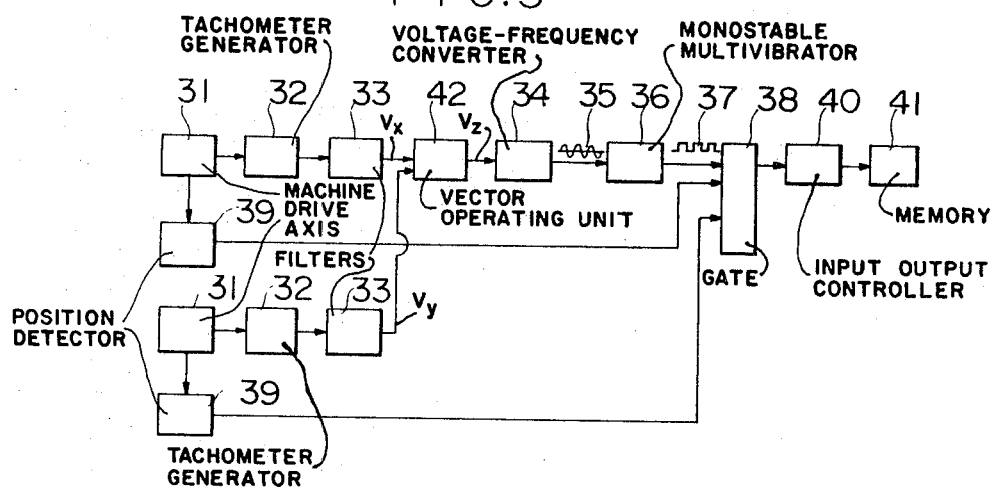

FIG. 3 shows another embodiment of this invention in which a sampling pitch corresponding to the linear velocity of a locus can be obtained instead of a sampling pitch corresponding to a single axis speed as in the case shown in FIG. 2.

In this embodiment speed components $V_x$ and $V_y$ along two rectangular cordinate axes X and Y of a machine drive axis 31 are detected by tachometer generators 32. The outputs of the tachometer generators 32 are applied to a conventional vector operating unit 42 through filter circuits 33, thereby providing a resultant of respective speed components $V_x$ and $V_y$, that is a locus velocity $V_z = \sqrt{V_x^2 + V_y^2}$. The output from the vector operating unit 42 is applied to a voltage-frequency converter 34 to obtain a sampling signal 35 having a frequency proportional to the locus speed. The output 35 of the voltage-frequency converter 34 is converted into a sampling pulse 37 by the operation of a monostable multivibrator 36 and the position data produced by axis position detectors 39 are stored in a memory device 41 through a gate circuit 38 and an input/output circuit 40 under the control of the sampling pulse in the same manner as has been described in connection with the embodiment shown in FIG. 2, thereby enabling to sample the position data having a definite spacing or interval corresponding to the setting of the locus velocity.

Although not shown in FIG. 3, where there are three or more axes, the mixture or resultant speed voltage $V_z$ is combined with a voltage representing the speed of an additional axis. by means of an additional vector operating unit, similar to unit 42, thus effecting automatic sampling of a locus for three or more axes at a definite spacing.

Figure 4:
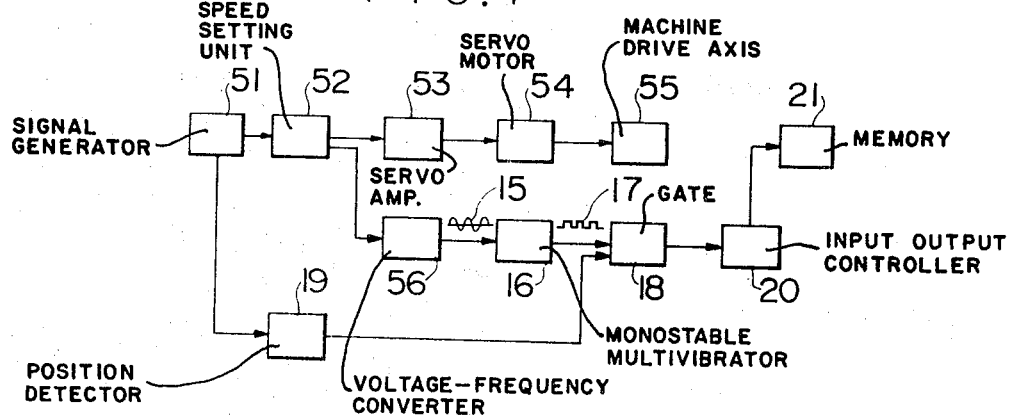

FIG. 4 shows still another embodiment of this invention in which when the speed is set, the position data are automatically sampled at an adequate sampling interval.

In this embodiment, in response to a signal generated by an axis movement command signal generator 51, a speed setting unit or a speed command unit 52 generates an analogue voltage. A portion of this invention is used to drive a machine drive axis 55 at a desired speed through a servo-amplifier 53 and a servo-valve or a servo-motor 54. The other portion of the analogue voltage produced by the speed setting unit 52 is applied to a voltage-frequency converter 56 to produce a sampling signal 15 having a frequency proportional to voltage. Signal 15 is used to store the axis position data generated by an axis position detector 19 in memory device 21 through monostable multivibrator 16, gate circuit 18 and input/output control circuit 20 in the same manner as in FIG. 2.

In this manner, as the axis is set by speed setting unit 52, a sampling signal having a frequency proportional to the set speed is generated to store in the memory device the position data having the desired sampling interval.

Instead of applying the output of the speed setting unit 52 directly upon the voltage-frequency converter 56, the speed setting unit 52 may be mechanically coupled to a sampling pulse frequency setting unit, not shown, thereby automatically determining the sampling frequency in accordance with the setting of the speed setting unit 52.

Alternatively, a digital command unit, not shown, may be substituted for the speed setting unit 52.

What is claimed is:

1. A method of sampling position data for use in the continuous path control of an industrial robot, said method comprising:
    generating a position data representing the position of a drive axis of said industrial robot,
    detecting the speed of movement of said drive axis,
    generating a sampling pulse signal comprised of a plurality of sampling pulses having a frequency which is a function of the speed of said drive axis, and
    sampling said position data in accordance with said sampling pulses at a rate which is a function of said speed of said drive axis.

2. The method according to claim 1 comprising staring said sampled position data in a memory device included in said continuous path control.

3. Apparatus for sampling position data in the continuous path control of an industrial robot, comprising:
    means for generating position data representing the position of a drive axis of said industrial robot,
    means for detecting the speed of movement of said drive axis,
    means for generating a sampling pulse signal comprised of a plurality of sampling pulses having a frequency which is a function of the speed of said drive axis, and
    means for sampling said position data in accordance with said sampling pulses at a rate which is a function of said speed of said drive axis.

4. Apparatus according to claim 3 wherein said sampling means comprises a gate circuit connected to receive said sampling pulses and said position data the position data being sampled by said gate circuit under the control of said sampling pulses, in said apparatus further comprising a memory device coupled to said gate circuit for storing said sampled position data.

5. Apparatus for sampling position data in the continuous path control of an industrial robot, comprising:
    means for generating a pulse signal representing the feed speed of a drive axis of said industrial robot,
    an integrator for integrating said pulse signal,
    a comparator for comparing the output from said integrator with a predetermined reference speed voltage,
    a sampling pulse generator responsive to the output from said comparator,
    means for detecting the position of said axis,
    a gate circuit for sampling the output from said position detector in accordance with the output from said sampling pulse generator, and
    a memory device for storing the position data sampled by said gate circuit.

6. Apparatus according to claim 5 wherein a plurality of pairs of serially connected speed comparators and sample pulse generators are connected in parallel between the output of said integrator and an input of said gate circuit, said comparators comparing the output from said integrator with different reference speed voltages and, when the comparators are supplied with differential inputs exceeding a predetermined level, producing outputs, and said sampling pulse generators operating at different frequencies corresponding to said different reference speed voltages.

7. Apparatus according to claim 5 which further comprises a monostable multivibrator connected to the input of said integrator for shaping the waveform of said pulse signal.

8. Apparatus for sampling position data in the continuous path control of an industrial robot, comprising:
means to generate a sampling pulse signal comprised of a plurality of sampling pulses having a frequency which is a function of the feed speed of a drive axis of said industrial robot,
a memory device,
a detector for detecting the position of said drive axis, and
a gate circuit for sampling the position data generated by said position detector in accordance with said sampling pulses, and for coupling the sampled position data to said memory device for storage thereof.

9. Apparatus according to claim 8 wherein said sampling pulse generating means comprises a tachometer generator coupled to said drive axis, and a voltage-frequency converter for converting the output of said tachometer generator into a sampling pulse signal having a frequency proportional to the output voltage of said tachometer generator.

10. Apparatus according to claim 9 which further includes a monostable multivibrator connected to the output of said voltage-frequency converter for shaping the waveform of the output thereof.

11. Apparatus according to claim 8 wherein said means for generating said sampling pulse signal comprises a vector operating unit which produces a signal representing a locus velocity of two speed components of the speed of said drive axis, and a voltage-frequency converter for converting said locus velocity signal into a sampling pulse signal having a frequency which is a function of the speed of said drive axis.

12. Apparatus according to claim 8 which further comprises an axis movement command signal generator, a speed setting unit responsive to the output from said axis movement command signal generator for producing an analogue voltage, means responsive to said analogue voltage for operating said drive axis at a speed set by said speed setting unit, and a voltage frequency converter for converting said analogue voltage into a sampling pulse signal having a frequency which is a function of said analogue voltage.

13. The method according to claim 1 wherein said sampling pulse signal has a frequency proportional to said speed of said drive axis.

14. Apparatus according to claim 3 wherein said sampling pulse signal has a frequency proportional to said speed of said drive axis.

15. Apparatus according to claim 4 wherein said sampling means includes a plurality of sampling pulse generators coupled to said gate cirucit, and means responsive to the speed of said drive axis for causing said position data to be sampled by one of said sampling pulse generators.

16. Apparatus according to claim 8 wherein said sampling pulse signal has a frequency proportional to said speed of said drive axis.

17. Apparatus according to claim 11 wherein said sampling pulse signal has a frequency proportional to said speed of said drive axis.

18. Apparatus according to claim 12 wherein said sampling pulse signal has a frequency proportional to said speed of said drive axis.

* * * * *